Oct. 5, 1943.  E. W. BUTZLER  2,330,865
RECOVERY OF PHOSPHATE FROM PHOSPHATE BOILER SLUDGE
Filed July 24, 1941
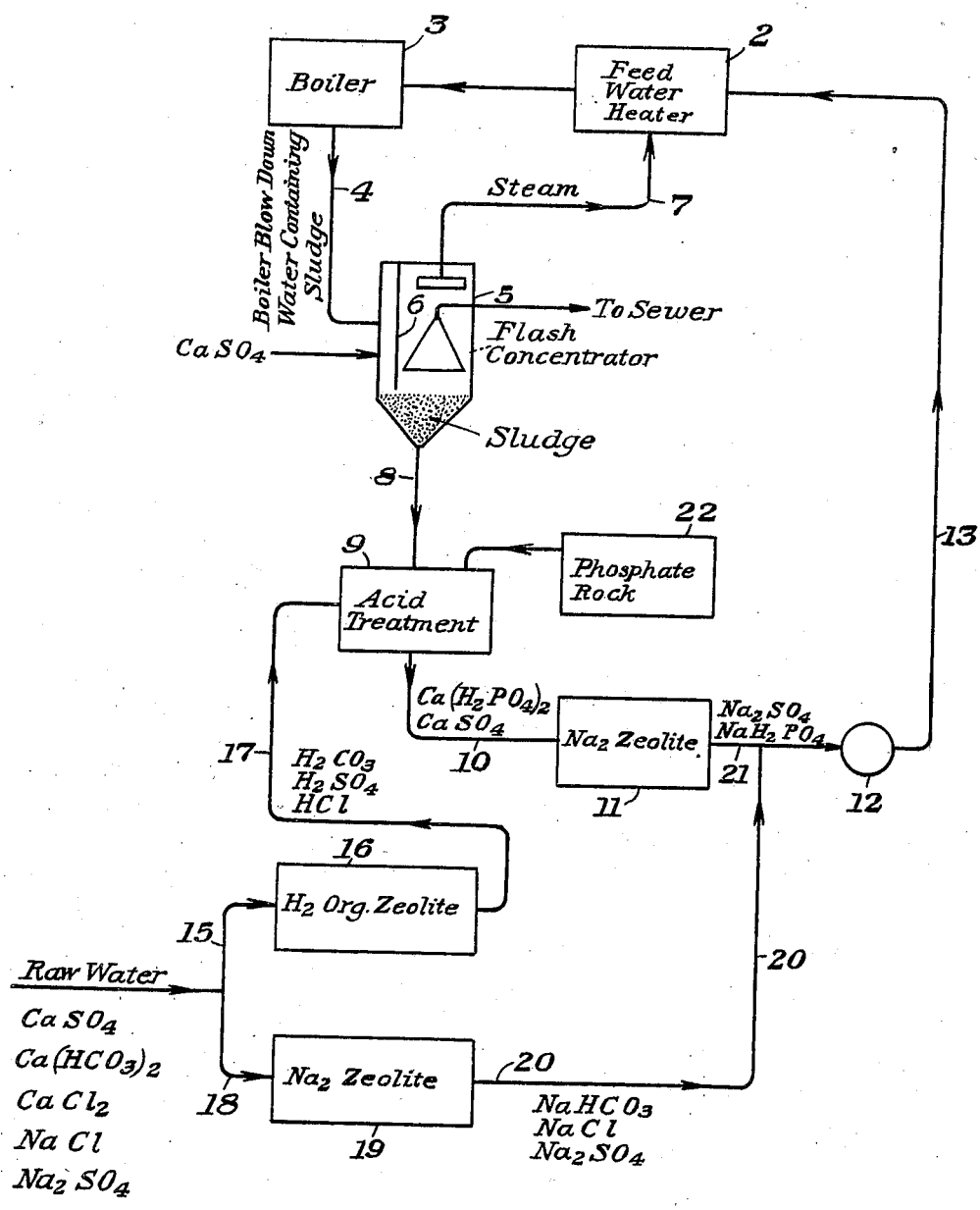
INVENTOR
Edward W. Butzler Patented Oct. 5, 1943

2,330,865

UNITED STATES PATENT OFFICE 2,330,865

RECOVERY OF PHOSPHATE FROM PHOSPHATE BOILER SLUDGE

Edward W. Butzler, West View, Pa., assignor to Hall Laboratories, Inc., Pittsburgh, Pa., a corporation of Pennsylvania Application July 24, 1941, Serial No. 403,775

8 Claims. (Cl. 210—16)

This invention relates to a process of recovering phosphate from phosphate boiler sludge. In the treatment of water for steam boiler use, the primary considerations are the elimination of scale and corrosion in the boilers and associated water piping. Other factors of considerable importance are those which are determinative of the quality of steam generated by the boiler, the fixed gas content of this steam and the feed water, and the relationships existing between the materials in solution in the boiler water, which are said to have an effect upon the so-called caustic embrittlement of boiler material.

The use of phosphate radical in various forms has become prevalent in the treatment of boiler water for the prevention of scale at high boiler pressures and the maintenance of alkalinities which are not conducive to caustic embrittlement. By phosphate radical is meant both the orthophosphate radical obtained by solution of soluble alkali-metal salts and hydrogen salts of tri-basic orthophosphoric acid, as well as alkali-metal molecularly dehydrated phosphates such as metaphosphates, pyrophosphates and tripolyphosphates which in the boiler are under suitable conditions converted to orthophosphates. A process in which phosphate radical is added to the boiler water to prevent the formation of adherent scale and to cause the precipitation of calcium as a non-adherent sludge is described in Hall Patent 1,613,656, granted January 11, 1927. The cost of phosphate salts for controlling the precipitation of calcium in the form of non-adherent sludge represents an appreciable expense and it is an object of the present invention to provide a process whereby a large proportion of the phosphate in the sludge may be recovered for reuse in the boiler water.

The phosphate used for water conditioning is for the most part precipitated in the boiler water as tricalcic orthophosphate $Ca_3(PO_4)_2$, although in some instances a substantial or major portion of this precipitation may occur after the addition of the soluble phosphate to the feed water system but before the water reaches the boiler. According to the present invention, settling basins or other means of accumulation for the tricalcic orthophosphate precipitate are provided, whether such precipitation occurs in the boiler or in the feed water system or is removed by blowdown from the boiler and is settled out from this blowdown water. This tricalcic phosphate sludge is removed periodically or continuously in the form of a more or less concentrated sludge and is treated with a sufficient quantity of suitable acid, such as sulphuric, hydrochloric, nitric, phosphoric, carbonic, sulphurous or acetic, to bring the tricalcic orthophosphate into solution as acid salts of phosphoric acid and calcium, or as phosphoric acid and calcium salts of the treating acid, or as a mixed system of dissolved calcium salts and acids.

For example, the addition of sulphuric acid to tricalcic orthophosphate in suitable concentrations will bring the same into solution containing hydrogen and calcium ions and sulphate and orthophosphate radicals. The solution resulting from dissolving the tricalcic orthophosphate sludge in acid is then passed through a base-exchange material, for example sodium zeolite which possesses the property of giving up sodium ion to the solution in exchange for calcium ion. Such base-exchange materials are of various origins, natural and synthetic, and of various efficiencies and resistivities to the action of acid solutions. The mixed solution containing phosphate radical is passed through the sodium base-exchange material, whereby the calcium of the acid solution is taken up by the solid and the sodium of the zeolite is taken into solution. For example, tricalcic orthophosphate which has been treated with sulphuric acid to give in solution calcium and hydrogen ions and sulphate and phosphate radicals with portions of some or all of the un-ionized salts corresponding thereto, will give when passed through a base-exchange material a solution substantially free from calcium and containing sodium, hydrogen, phosphate, and sulphate ions, and a certain amount of some or all of the un-ionized salts which correspond thereto. This effluent solution from the base-exchange material is used as such or in the evaporated, crystallized or diluted form as a source of phosphate radical for the treatment and conditioning of feed water for the boiler.

The accompanying drawing is a diagrammatic illustration in flow sheet form of one manner of carrying out my invention.

Referring now more particularly to the accompanying drawing, the boiler water is heated in a feed water heater 2 and delivered from the heater to a boiler 3. The water delivered to the feed water heater contains phosphate radical from a source which will be described more in detail hereinafter, this phosphate radical causing the precipitation of calcium and magnesium in the boiler water in the form of non-adherent sludge rather than as scale. The sludge which consists for the most part of tricalcic orthophosphate $Ca_3(PO_4)_2$ is removed periodically or continuously by blowdown through the conduit 4 and is delivered to a flash concentrator 5. The sludge entering the flash concentrator strikes against a baffle 6 which separates the steam from the sludge and the steam is returned through a conduit 7 to the feed water heater 2. The tricalcic orthophosphate sludge contains some entrained soluble phosphate, for example trisodium orthophosphate. The soluble phosphate present in the blowdown water may be allowed to run to waste but preferably it is precipitated by adding thereto calcium sulphate, lime, calcium chloride or some other alkaline earth metal salt which will cause the soluble phosphate to be precipitated as tricalcium phosphate or other insoluble phosphate; thus:

*Equation 1*

$$3CaSO_4 + 2Na_3PO_4 \rightarrow 3Na_2SO_4 + Ca_3(PO_4)_2$$

The soluble salts from the blowdown and from the interaction of the added calcium compounds with the soluble phosphate in the blowdown are preferably washed out, in order to keep the total solids in the boiler water as low as possible.

The tricalcic orthophosphate sludge and the tricalcic phosphate precipitated in the flash concentrator flow from the bottom of the concentrator through a conduit 8 into an acid treating vessel 9. In the vessel 9, acid is added to the sludge to dissolve it. The acid used for dissolving the sludge may be sulphuric, hydrochloric, nitric, phosphoric, carbonic, sulphurous, acetic or any other suitable acid which will bring the sludge into solution. Taking sulphuric acid as the acid used in dissolving the sludge, the reaction may be represented thus:

*Equation 2*

$$Ca_3(PO_4)_2 + 2H_2SO_4 \rightarrow Ca(H_2PO_4)_2 + CaSO_4$$

Both the calcium sulphate and the monocalcium dihydrogen phosphate resulting from Equation 2 are in solution because of the acidity of the solution and the small concentration of the salts. If the amount of sulphuric acid used in dissolving the sludge is decreased as compared to the quantity used according to Equation 2, the solution will contain calcium hydrogen phosphate $CaHPO_4$ according to Equation 3:

*Equation 3*

$$Ca_3(PO_4)_2 + H_2SO_4 \rightarrow 2CaHPO_4 + CaSO_4$$

If, on the other hand, the proportion of sulphuric acid is increased as compared to the amount used in Equation 2, the acid solution will contain phosphoric acid $H_3PO_4$ and calcium sulphate. Corresponding salts in solution will be formed, if other acids are employed in place of sulphuric acid for dissolving the sludge.

The solution resulting from the acid treatment of the sludge is filtered and then passed through the conduit 10 and through a base-exchange material 11 containing, for example, sodium or other alkali-metal zeolite. Where the acidity of the solution to be passed through the base-exchange material is not such as to unduly attack the latter, the zeolitic material may be of either the inorganic or organic variety. These base-exchange materials are well known per se and therefore are not described in detail. Where, however, the solution to be passed through the base-exchange material is of such high acidity that it would unduly attack an inorganic zeolite, the organic type of base-exchange material should be employed.

In passing through the sodium base-exchanger 11, the calcium salts in the acid solution are converted into sodium salts, the sodium of the base exchanger being exchanged for the calcium of the solution, so that the effluent from the base-exchanger contains in solution the ions corresponding to sodium phosphate. Thus if in the acid treatment in the vessel 9 sulphuric acid has been used in amount to produce a solution containing $Ca(H_2PO_4)_2$ and $CaSO_4$, the reactions occurring in the base-exchanger 11 may be represented as follows:

*Equation 4*

$$Ca(H_2PO_4)_2 + Na_2 \text{ base-exchanger} \rightarrow$$
$$Ca \text{ base-exchanger} + 2NaH_2PO_4$$

*Equation 5*

$$CaSO_4 + Na_2 \text{ base-exchanger} \rightarrow$$
$$Ca \text{ base-exchanger} + Na_2SO_4$$

The effluent solution from the base-exchange material 11, which solution contains phosphate and sodium ions, is then returned by a pump 12 and conduit 13 to the feed water heater 2. The soluble phosphate, for example $NaH_2PO_4$, either as such or in a more alkaline form, causes the precipitation of calcium in the boiler water as tricalcic orthophosphate sludge, which is then treated as just described.

As a modification of the process which has been described, at least a portion of the acid which is to be used in dissolving the sludge in the vessel 9 may be obtained by passing raw water containing calcium ions and acid radicals through a hydrogen-containing organic base-exchange material, so that the effluent from this material is an acid solution. For example, consider a raw water containing $CaSO_4$, $Ca(HCO_3)_2$, $CaCl_2$, $NaCl$ and $Na_2SO_4$. A portion of this raw water is passed through a conduit 15 into and through hydrogen-containing organic base-exchange material 16, for example hydrogen organic zeolite. The calcium and sodium of the raw water are exchanged for the hydrogen of the base-exchange material 16, so that the effluent from 16 contains $H_2CO_3$, $H_2SO_4$ and $HCl$. Thus:

*Equation 6*

$$H_2 \text{ base-exchanger} + Ca(HCO_3)_2 \rightarrow$$
$$Ca \text{ base-exchanger} + 2H_2CO_3$$

*Equation 7*

$$H_2 \text{ base-exchanger} + CaSO_4 \rightarrow$$
$$Ca \text{ base-exchanger} + H_2SO_4$$

*Equation 8*

$$H_2 \text{ base-exchanger} + CaCl_2 \rightarrow$$
$$Ca \text{ base-exchanger} + 2HCl$$

*Equation 9*

$$H_2 \text{ base-exchanger} + 2NaCl \rightarrow$$
$$Na_2 \text{ base-exchanger} + 2HCl$$

*Equation 10*

$$Na_2SO_4 + H_2 \text{ base-exchanger} \rightarrow$$
$$Na_2 \text{ base-exchanger} + H_2SO_4$$

This acid effluent from the base-exchanger 16 is then passed through a conduit 17 to the acid treating vessel 9 to dissolve the sludge from the concentrator 5.

Another portion of the raw water previously referred to is passed through a conduit 18 into sodium base-exchange material 19. The calcium sulphate of the raw water is converted according to Equation 5 into sodium sulphate. The Ca(HCO3)2 is converted into NaHCO3 according to Equation 11:

Equation 11

$$Ca(HCO_3)_2 + Na_2 \text{ base-exchanger} \rightarrow Ca \text{ base-exchanger} + 2NaHCO_3$$

The calcium chloride is converted into sodium chloride according to Equation 12:

Equation 12

$$CaCl_2 + Na_2 \text{ base-exchanger} \rightarrow Ca \text{ base-exchanger} + 2NaCl$$

The effluent from the base-exchanger 19 contains NaHCO3 and is alkaline. This alkaline solution is passed through a conduit 20 to the conduit 21, where it mixes wish the acid solution coming from the base-exchange material 11 and the mixed solution is then returned through the conduit 13 to the feed water heater 2. In the feed water heater or boiler, the NaHCO3 is converted into sodium carbonate and then into sodium hydroxide. The sodium hydroxide and NaH2PO4 react to form trisodium orthophosphate. Thus:

Equation 13

$$NaH_2PO_4 + 2NaOH \rightarrow Na_3PO_4 + 2H_2O$$

The trisodium orthophosphate reacts with the calcium in the boiler water to precipitate tricalcic orthophosphate according to the following equation:

Equation 14

$$2Na_3PO_4 + 3Ca(OH)_2 \rightarrow Ca_3(PO_4)_2 + 6NaOH$$

Where the feedwater does not contain adequate potential alkali in the form of bicarbonate and carbonate, it may be desirable to feed caustic soda or soda ash at some appropriate point between the base-exchanger 11 and the boiler 3, preferably directly to the latter, where prior addition might result in feed-line scale of calcium phosphate. In any case, the alkalinity in the boiler is controlled to maintain a desirable low level.

In some cases, it may be desirable to add phosphorus-containing material to the system in order to replace the portion which is lost in the various steps of the process. In such case, I may add phosphate rock 22 to the acid treating vessel 9 along with the acid and the sludge. The phosphate rock is dissolved by the acid in a manner similar to the dissolving of the phosphate sludge to produce a solution containing calcium ions and phosphate radicals. This solution is then passed through the conduit 10 and the base-exchanger 11 and returned to the feed water heater as previously described. Of course, I could treat the phosphate rock with the acid solution coming from the base-exchange material 16 in a vessel separate from the vessel 9, in order to solubilize the phosphate rock and then add the solution of the phosphate rock to the solution formed by dissolving the sludge in acid. Furthermore, I could dissolve the phosphate rock in acid which is obtained from some other source than by passing raw water through the base-exchange material 16.

It is desirable in carrying out the process to minimize the return of dissolved salts to the boiler. One way of accomplishing this is to utilize carbon dioxide or sulphur dioxide as the dissolving agent for the calcium phosphate sludge. The acid solution is then passed through the base-exchange material 11 as previously described and the carbon dioxide is stripped from the sodium phosphate solution in the feedwater heater 2. By pulling off the vapor from the feedwater heater through a condenser, the carbon dioxide can be recycled and used again in the acid treatment vessel 9 where the calcium phosphate sludge is dissolved. Any loss of carbon dioxide may be made up by recovery of some of this constituent from the stack gas of the plant. By using sulphur dioxide in place of carbon dioxide for dissolving the calcium phosphate sludge, and controlling the stripping operation in the feedwater heater, it is possible to leave enough sulphur dioxide in the feedwater to act as a scavenger for any oxygen present. Since a mixture of carbon dioxide and sulphur dioxide may be obtained from the plant stack gases, it may be possible not only to regenerate phosphate from the calcium phosphate sludge but also to supply oxygen scavenger.

The base-exchangers 11 and 19 may be regenerated by sodium chloride or other suitable sodium salt in a known manner and according to the following equation:

Equation 15

$$Ca \text{ base-exchanger} + NaCl \rightarrow Na_2 \text{ base-exchanger} + CaCl_2$$

In a similar manner, the zeolite 16 may be regenerated with sulphuric, hydrochloric or other suitable acid according to the equation:

Equation 16

$$Ca \text{ base-exchanger} + H_2SO_4 \rightarrow H_2 \text{ base-exchanger} + CaSO_4$$

It will be seen that a cyclic process has been provided whereby phosphate radical acts as a carrier of sodium ion into the feed or boiler water, forces the exchange of this sodium for the calcium in the boiler water according to the above mentioned Hall Patent 1,613,656 and the calcium is precipitated as non-adherent calcium phosphate sludge. This phosphate sludge is then dissolved in acid and the acid solution is passed through base-exchange material of the type containing sodium whereby the sodium of the base-exchange material is exchanged for the calcium of the solution and a solution is produced containing sodium ions and phosphate radicals which are returned to the boiler. At least a portion of the acid to be used in dissolving the sludge may be obtained by passing water containing calcium ions and acid radicals through hydrogen containing organic base-exchange material to produce an acid solution. Where necessary in order to compensate for loss of phosphate in the process, a phosphate material such as phosphate rock may be dissolved in acid and then passed through a sodium-containing organic base-exchanger to produce a solution containing phosphate radicals and sodium ions.

The invention is not limited to the preferred materials or process or apparatus, which have been used merely for illustrative purposes, but the invention may be otherwise embodied or practiced within the scope of the following claims.

I claim:
1. The process of recovering phosphate from boiler sludge containing phosphate and alkaline earth metal, which comprises dissolving the sludge with acid, and passing the resulting dilute solution through alkali-metal base-exchange ma- terial whereby alkaline earth ion present in the solution is replaced by alkali-metal ion.

2. The process of recovering phosphate from boiler sludge containing phosphate and calcium, which comprises dissolving the sludge with acid, and passing the resulting dilute solution through sodium base-exchange material whereby calcium ion present in the solution is replaced by sodium ion.

3. The process of recovering phosphate from boiler sludge containing phosphate and calcium, which comprises dissolving the sludge with acid, and passing the resulting dilute solution through sodium inorganic base-exchange material whereby calcium ion present in the solution is replaced by sodium ion.

4. The process of recovering phosphate from boiler sludge containing phosphate and calcium, which comprises dissolving the sludge with acid, passing the resulting dilute solution through sodium base-exchange material whereby calcium ion present in the solution is replaced by sodium ion, and returning the solution containing phosphate radical and sodium ion to the boiler to precipitate calcium from the boiler water in the form of calcium phosphate sludge.

5. A process according to claim 4, in which at least a portion of the acid used in dissolving the sludge is obtained by passing water containing calcium ion and acid radicals through hydrogen containing organic base-exchange material.

6. The process of recovering phosphate from boiler water containing sludge and soluble phosphate, which comprises adding a reagent to the boiler water to form a precipitate from the soluble phosphate, collecting the precipitate and sludge, dissolving the precipitate and sludge with acid, and passing the resulting solution through alkali-metal base exchange material whereby alkaline earth ion present in the solution is replaced by alkali-metal ion.

7. A process according to claim 4, in which alkaline earth phosphate material other than the phosphate sludge is dissolved in acid and the resulting solution is passed through base-exchange material.

8. The process of recovering phosphate from boiler sludge containing phosphate and calcium, which comprises dissolving the sludge with sulphuric acid to form a solution containing calcium, phosphate, and sulphate radicals, passing the resulting dilute solution through sodium base exchange material whereby calcium radical present in the solution is replaced by sodium radical, and returning the solution containing sodium, phosphate and sulphate radicals to the boiler to precipitate calcium from the boiler water in the form of calcium phosphate sludge and to control caustic embrittlement in the boiler.

EDWARD W. BUTZLER.